US012678366B1

(12) United States Patent
Zhao

(10) Patent No.: US 12,678,366 B1
(45) Date of Patent: Jul. 14, 2026

(54) MULTI-FUNCTIONAL MASSAGER

(71) Applicant: Dongguan Yishuo Electronic Technology Co., Ltd., Dongguan (CN)

(72) Inventor: Quan Zhao, Dongguan (CN)

( * ) Notice: Subject to any disclaimer, the term of this patent is extended or adjusted under 35 U.S.C. 154(b) by 0 days.

(21) Appl. No.: 19/270,416

(22) Filed: Jul. 15, 2025

(30) Foreign Application Priority Data

Jun. 6, 2025 (CN) ......................... 202521145745.7

(51) Int. Cl.
*A61H 19/00* (2006.01)

(52) U.S. Cl.
CPC ............. *A61H 19/34* (2013.01); *A61H 19/40* (2013.01); *A61H 2205/087* (2013.01)

(58) Field of Classification Search
CPC .. A61H 19/34; A61H 19/40; A61H 2205/087; A61H 19/00; A61H 19/50; A61H 23/0254; A61H 7/004–005; A61H 7/007
See application file for complete search history.

(56) References Cited

U.S. PATENT DOCUMENTS 6,026,521 A * 2/2000 Atkins .................... E03D 11/16 285/15
11,826,300 B1 * 11/2023 Zhou ...................... A61H 19/34
12,285,377 B1 * 4/2025 Lu .......................... A61H 23/02
2009/0093673 A1 * 4/2009 Lee ........................ A61H 19/44 600/38
2016/0120737 A1 * 5/2016 Sedic ................. A61H 23/0263 601/46
2020/0107986 A1 * 4/2020 Murray .................. A61H 19/30
2024/0252384 A1 * 8/2024 Zhou ...................... A61H 7/008
2025/0128017 A1 * 4/2025 Cai ..................... F21V 33/0068

FOREIGN PATENT DOCUMENTS

CN 110292516 * 10/2019 ............. A61H 23/02
WO WO-2011159906 A2 * 12/2011 ........... A61N 1/0524

OTHER PUBLICATIONS

CN_110292516_machine_translation_accessed_Sep. 25, 2025 (Year: 2025).*

* cited by examiner

*Primary Examiner* — Victoria Murphy
*Assistant Examiner* — Kris Hanyu Gong

(57) ABSTRACT

A multi-functional massager, comprising a handle silicone, wherein a plastic handle left shell and a plastic handle right shell are arranged inside the handle silicone and are detachably connected; a silicone neck is connected to each of the plastic handle left shell and the plastic handle right shell, and the silicone neck is connected to a plastic partial-bird right shell and a plastic partial-bird left shell that are detachably connected and both arranged inside the handle silicone; a gearbox motor is installed inside the plastic partial-bird right shell and the plastic partial-bird left shell. The invention utilizes a gearbox motor and eccentric rotating shaft to drive the plastic swing member, achieving highly biomimetic swinging that simulates the opening/closing rhythm of a biological mouth. Combined with the silicone material of the handle silicone, a gentle and rhythmic physical stimulation is created.

11 Claims, 8 Drawing Sheets

MULTI-FUNCTIONAL MASSAGER

TECHNICAL FIELD

The invention relates to the technical field of massagers, and in particular to a massager with at least one hand-held handle or a rod body, specifically a multi-functional massager.

BACKGROUND ART

In today's fast-paced society, individuals face immense pressure from work, life, and other aspects. Prolonged exposure to such high-stress conditions can lead to various types of fatigue and discomfort in the body, especially in areas in close contact with the body and prone to accumulated tension, such as the perioral region and internal sensitive areas. To alleviate these discomforts and relax the body and mind, massage, as a traditional soothing method, has garnered widespread attention and application.

Traditional massage primarily relies on manual techniques, stimulating specific body parts through actions like kneading, pinching, pushing, and pressing to achieve muscle relaxation, promote blood circulation, and relieve pain. However, manual massage has limitations. For instance, the skill level and physical condition of the masseur directly affect the massage effect. Furthermore, manual massage requires assistance from others and is subject to temporal and spatial constraints, making it unable to meet people's needs at any time.

With continuous technological advancement, various massagers have emerged, providing people with more convenient and efficient massage solutions. Traditional massagers often employ relatively mechanical massage methods, failing to adequately simulate the complex techniques and rhythmic sensation of manual massage. For areas requiring specific stimulation patterns, the massage effect is often unsatisfactory. Taking the perioral region and internal sensitive areas as examples, these regions feature complex and sensitive structures, requiring more precise and diversified massage stimulation to achieve effective relaxation and soothing.

SUMMARY OF THE INVENTION

To address the shortcomings of the prior art, the invention provides a multi-functional massager that solves the problems of traditional massagers being overly mechanical and yielding unsatisfactory massage effects.

To achieve the above objectives, the invention is realized through the following technical solution: a multi-functional massager, comprising a handle silicone, wherein a plastic handle left shell and a plastic handle right shell are arranged inside the handle silicone and are detachably connected; a silicone neck is connected to each of the plastic handle left shell and the plastic handle right shell, and the silicone neck is connected to a plastic partial-bird right shell and a plastic partial-bird left shell that are detachably connected and both arranged inside the handle silicone; a gearbox motor is installed inside the plastic partial-bird right shell and the plastic partial-bird left shell, and an output end of the gearbox motor is fixed with an eccentric rotating shaft that is connected to a plastic swing member; a portion of the plastic swing member extends into an interior of the plastic partial-bird right shell and the plastic partial-bird left shell, and another portion is exposed outside; the gearbox motor drives the eccentric rotating shaft to rotate, and the rotation of the eccentric rotating shaft drives the plastic swing member to swing arbitrarily at 360 degrees.

Preferably, the plastic swing member is connected to an internal vibration motor that is located inside the handle silicone.

Preferably, the plastic handle left shell and the plastic handle right shell are provided with a fixing structure that is connected to a soft rubber tongue sleeve.

Preferably, the fixing structure comprises a left sheath fixing member and a right sheath fixing member that are detachably connected; the left sheath fixing member and the right sheath fixing member together fix the soft rubber tongue sleeve to an outer wall of the plastic handle left shell and the plastic handle right shell.

Preferably, a gearbox motor is installed inside the plastic handle left shell and the plastic handle right shell, and an output end of the gearbox motor is connected to a winding mechanism that is located inside the soft rubber tongue sleeve.

Preferably, the winding mechanism comprises a winding rotating shaft that is fixedly connected to the output end of the gearbox motor, and a winding swing piece is arranged on an outer wall of the winding rotating shaft; a plastic winding fixing member is connected to outer walls of both the winding rotating shaft and the winding swing piece, and the plastic winding fixing member is nested on the outer wall of the plastic handle left shell and the plastic handle right shell.

Preferably, the winding mechanism is connected to a motor lower shell that is detachably connected to a motor upper shell, and a vibration motor is installed inside the motor lower shell and the motor upper shell; both the motor lower shell and the vibration motor are located inside the soft rubber tongue sleeve.

Preferably, it further comprises a power supply module and an operation interaction module that are electrically connected; the power supply module is configured to supply electrical energy to various functional components of the massager, and the operation interaction module is configured for user interaction with the massager to control operation of the massager.

Preferably, the power supply module comprises one or more batteries that are installed inside the plastic handle left shell and the plastic handle right shell.

Preferably, the battery or batteries are electrically connected to a magnetic charging pin board assembly that is installed inside the plastic handle left shell and the plastic handle right shell.

Preferably, the operation interaction module comprises a PCBA (Printed Circuit Board Assembly) that is installed inside the plastic handle left shell and the plastic handle right shell; the PCBA is operable via buttons and is electrically connected to the battery or batteries, the gearbox motor, the vibration motor, the gearbox motor, and the internal vibration motor.

Preferably, the plastic handle left shell and the plastic handle right shell are connected to a digital display transparent cover that is located outside a digital display light shield.

Preferably, the PCBA is provided with a digital display light shield, and a plastic electroplated part is provided inside each of the plastic handle left shell and the plastic handle right shell.

Preferably, the detachable connection is implemented via a bolted connection.

Working principle: when using the massager, after charging is completed, the user can grip and adjust the device.

Upon activating the massager, the gearbox motor inside the massager starts. The eccentric rotating shaft connected to the output end of the gearbox motor is linked to the plastic swing member. The gearbox motor drives the eccentric rotating shaft to rotate, converting rotational motion into swinging motion, driving the plastic swing member to swing at 360 degrees. The plastic swing member has a shape simulating a mouth. It drives the local area of the handle silicone to produce a gentle and rhythmic swinging motion. Simultaneously, the internal vibration motor connected to the plastic swing member activates. High-frequency vibrations are precisely transmitted through the plastic swing member to the mouth-simulating massage area. This vibration combines with the swinging motion to form a combined stimulation, providing the user with a unique massage experience.

The gearbox motor inside the massager starts, and the winding mechanism connected to the output end is located inside the soft rubber tongue sleeve. The gearbox motor drives the winding rotating shaft to rotate, converting rotational motion into a winding motion, thereby driving the winding swing piece to perform synchronous wave-like oscillations. These oscillations are transmitted through the soft rubber tongue sleeve. After the soft rubber tongue sleeve is inserted into the user's body, it can stimulate internal sensitive areas in a biomimetic peristaltic manner. Additionally, on the side of the winding mechanism away from the internal vibration motor, the vibration motor installed inside the motor lower shell and motor upper shell activates. The vibration effect it produces cooperates with the biomimetic peristalsis of the winding mechanism, forming a multi-dimensional massage mode to further enhance the massage effect.

Throughout the use process, the user can control the massager through the operation interaction module. The PCBA acts as the control center. The user operates the PCBA via buttons. The power supply module feeds back information such as battery status to the operation interaction module for display on the PCBA's display area, allowing the user to monitor the massager's operating status and battery level conveniently.

The multi-functional massager provided by the invention has the following beneficial effects.

1. The invention utilizes a gearbox motor and eccentric rotating shaft to drive the plastic swing member, achieving highly biomimetic swinging that simulates the opening/closing rhythm of a biological mouth. Combined with the silicone material of the handle silicone, a gentle and rhythmic physical stimulation is created.

2. Further, the internal vibration motor transmits high-frequency vibrations through the plastic swing member, combining with the swinging motion to form a "swinging and vibration" combined stimulation mode, covering areas of different sensitivities.

3. The invention employs a gearbox motor to drive the winding rotating shaft (featuring a winding shape design) in cooperation with the winding swing piece, enabling the soft rubber tongue sleeve to achieve biomimetic peristalsis. The motion trajectory simulates biological muscle contraction. Combined with the material of the soft rubber tongue sleeve, internal sensitive areas are precisely stimulated.

4. Further, the vibration motor works in conjunction with the winding mechanism, forming a "peristalsis and vibration" multi-dimensional stimulation, enhancing the layering of the massage effect.

5. The integration of the battery, magnetic charging pin board assembly, and PCBA within the handle supports convenient charging. The digital display transparent cover and digital display light shield protect the display area, improving the reliability of operational interaction. The integrated solution of the power supply module and control module, along with the protected display interaction structure, makes it suitable for portable massage designs.

BRIEF DESCRIPTION OF ACCOMPANY DRAWINGS

Figure 1:
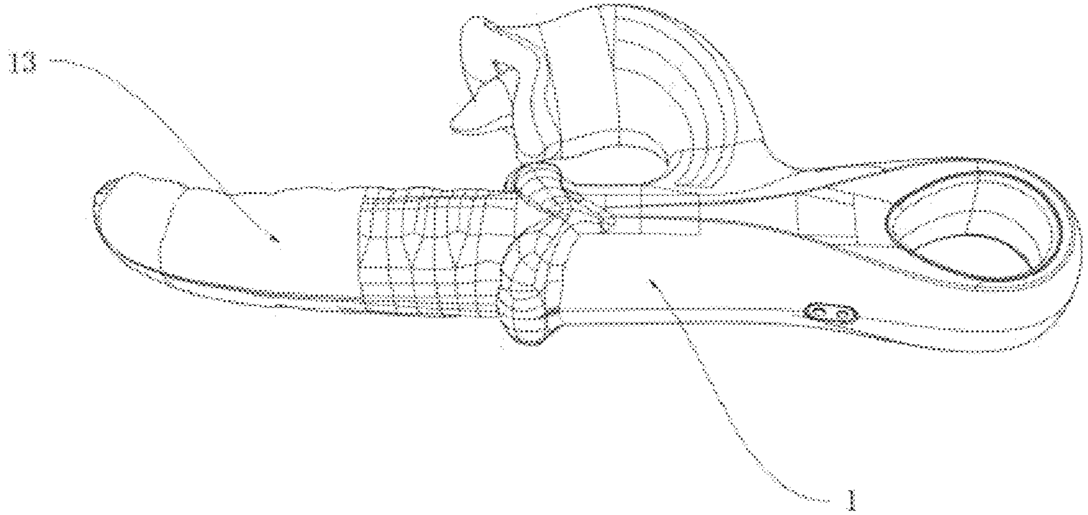
FIG. 1 is a perspective view according to the invention.
Figure 2:
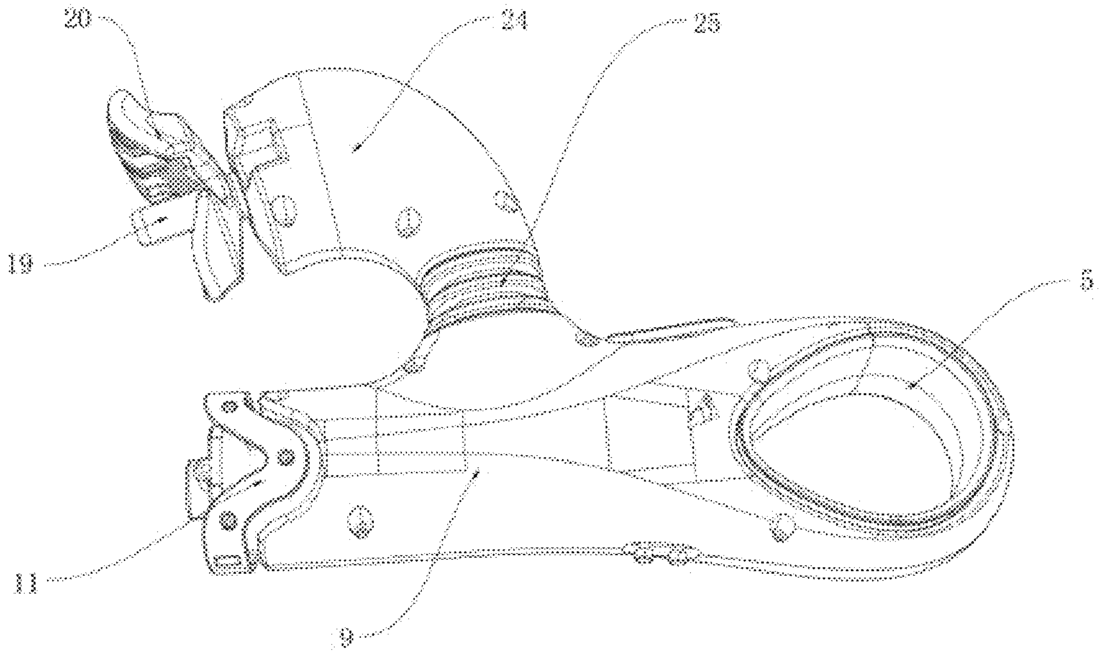
FIG. 2 is a schematic structural view of the plastic handle right shell according to the invention.

In the figures: 1 refers to the handle silicone; 2 refers to the PCBA (Printed Circuit Board Assembly); 3 refers to the digital display transparent cover; 4 refers to the digital display light shield; 5 refers to the plastic electroplated part; 6 refers to the battery; 7 refers to the magnetic charging pin board assembly; 8 refers to the plastic handle left shell; 9 refers to the plastic handle right shell; 10 refers to the gearbox motor; 11 refers to the left sheath fixing member; 12 refers to the right sheath fixing member; 13 refers to the soft rubber tongue sleeve; 14 refers to the winding rotating shaft; 15 refers to the winding swing piece; 16 refers to the motor lower shell; 17 refers to the vibration motor; 18 refers to the motor upper shell; 19 refers to the internal vibration motor; 20 refers to the plastic swing member; 21 refers to the plastic partial-bird left shell; 22 refers to the eccentric rotating shaft; 23 refers to the gearbox motor; 24 refers to the plastic partial-bird right shell; 25 refers to the silicone neck; 26 refers to the plastic winding fixing member.

SPECIFIC EMBODIMENT OF THE INVENTION

The technical solutions in the embodiments of the invention will be clearly and completely described hereinafter with reference to the drawings in the embodiments of the invention. Obviously, the described embodiments are only a part of the embodiments of the invention, rather than all the embodiments. Based on the embodiments of the invention, all other embodiments obtained by those of ordinary skill in the art without creative efforts shall fall within the protection scope of the invention.

With reference to FIGS. 1-5, the invention provides a multi-functional massager, comprising a handle silicone 1, wherein a plastic handle left shell 8 and a plastic handle right shell 9 are arranged inside the handle silicone 1 and are detachably connected; a silicone neck 25 is connected to each of the plastic handle left shell 8 and the plastic handle right shell 9, and the silicone neck 25 is connected to a plastic partial-bird right shell 24 and a plastic partial-bird left shell 21 that are detachably connected and both arranged inside the handle silicone 1; a gearbox motor 23 is installed inside the plastic partial-bird right shell 24 and the plastic partial-bird left shell 21, and an output end of the gearbox motor 23 is fixed with an eccentric rotating shaft 22 that is connected to a plastic swing member 20; a portion of the plastic swing member 20 extends into an interior of the plastic partial-bird right shell 24 and the plastic partial-bird left shell 21, and another portion is exposed outside; the gearbox motor 23 drives the eccentric rotating shaft 22 to rotate, and the rotation of the eccentric rotating shaft 22 drives the plastic swing member 20 to swing arbitrarily at 360 degrees.

Specifically, the handle silicone 1 is made of silicone and has a soft, skin-friendly texture with good elasticity and flexibility, which not only conforms to the human body's curves, providing a gentle touch sensation, but also covers the outer surfaces of the plastic handle left shell 8, plastic handle right shell 9, plastic partial-bird left shell 21, and plastic partial-bird right shell 24. The plastic handle left shell 8 and plastic handle right shell 9 are connected to the plastic partial-bird left shell 21 and plastic partial-bird right shell 24 via the silicone neck 25, which is also made of silicone material. The gearbox motor 23 can be an N20 type gearbox motor. The gearbox motor 23 drives the eccentric rotating shaft 22 to rotate, and the eccentric rotating shaft 22 performs circular rotation. Due to its eccentric design, centrifugal force is generated during rotation, thereby converting the circular motion of the gearbox motor 23 into a swinging motion. The plastic swing member 20 can swing at 360 degrees. The plastic partial-bird left shell 21 and plastic partial-bird right shell 24 support the swinging of the plastic swing member 20. The shape of the plastic swing member 20 can simulate the shape of a mouth. The plastic swing member 20 swings at a set frequency and amplitude, causing the local area of the handle silicone 1 to produce a gentle and rhythmic swinging motion. Through this combination of biomimetic simulation and mechanical motion, it provides the user with a rich and comfortable stimulation experience.

Figure 4:
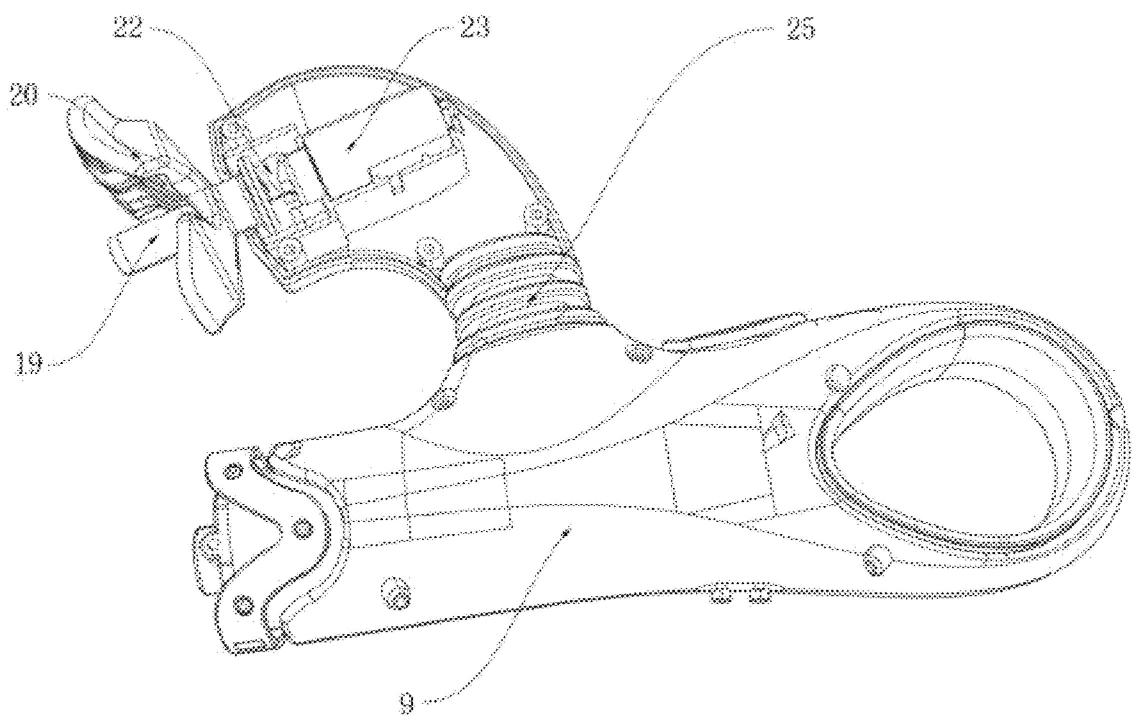
FIG. 4 is a schematic structural view of the eccentric rotating shaft according to the invention.

With reference to FIG. 4, the plastic swing member 20 is connected to an internal vibration motor 19 that is located inside the handle silicone 1.

Specifically, to further enhance the massage experience, the plastic swing member 20 is connected to an internal vibration motor 19. When the internal vibration motor 19 activates, high-frequency vibrations are precisely transmitted through the plastic swing member 20 to the mouth-simulating massage area, combining with the 360-degree swinging motion of the plastic swing member 20 to form a combined stimulation.

Figure 5:
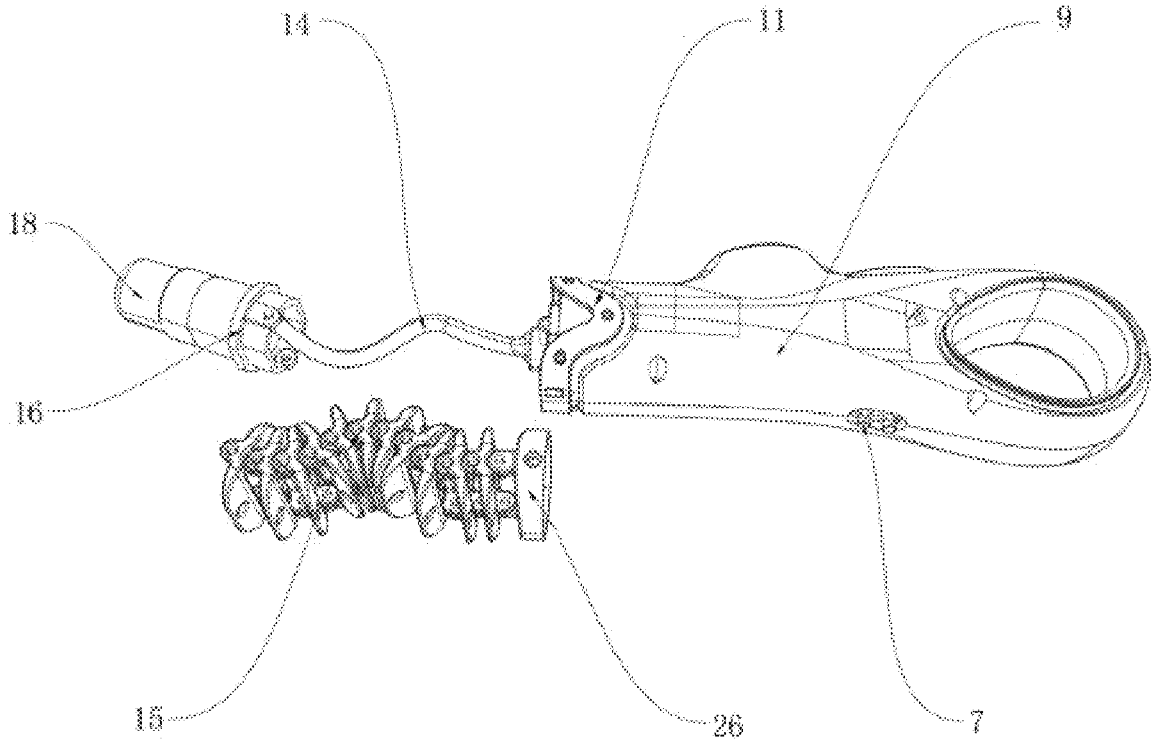
FIG. 5 is a schematic structural view of the winding swing piece according to the invention.

With reference to FIGS. 1 and 5, the plastic handle left shell 8 and the plastic handle right shell 9 are provided with a fixing structure that is connected to a soft rubber tongue sleeve 13.

Specifically, on the plastic handle left shell 8 and plastic handle right shell 9, a dedicated fixing structure is provided. This structure consists of a left sheath fixing member 11 and a right sheath fixing member 12 that are detachably connected. The plastic handle left shell 8 and plastic handle right shell 9 are connected to the soft rubber tongue sleeve 13 via a fixing structure. The soft rubber tongue sleeve 13 can be made of soft rubber material.

Figure 3:
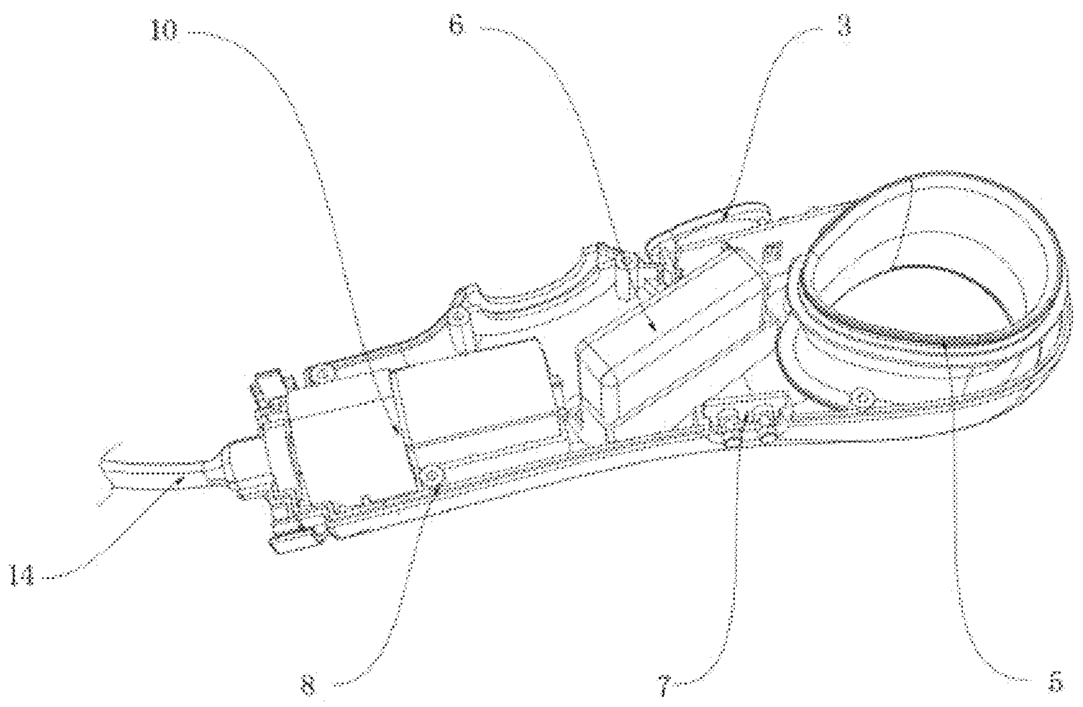
FIG. 3 is a schematic structural view of the plastic handle left shell according to the invention.
Figure 8:
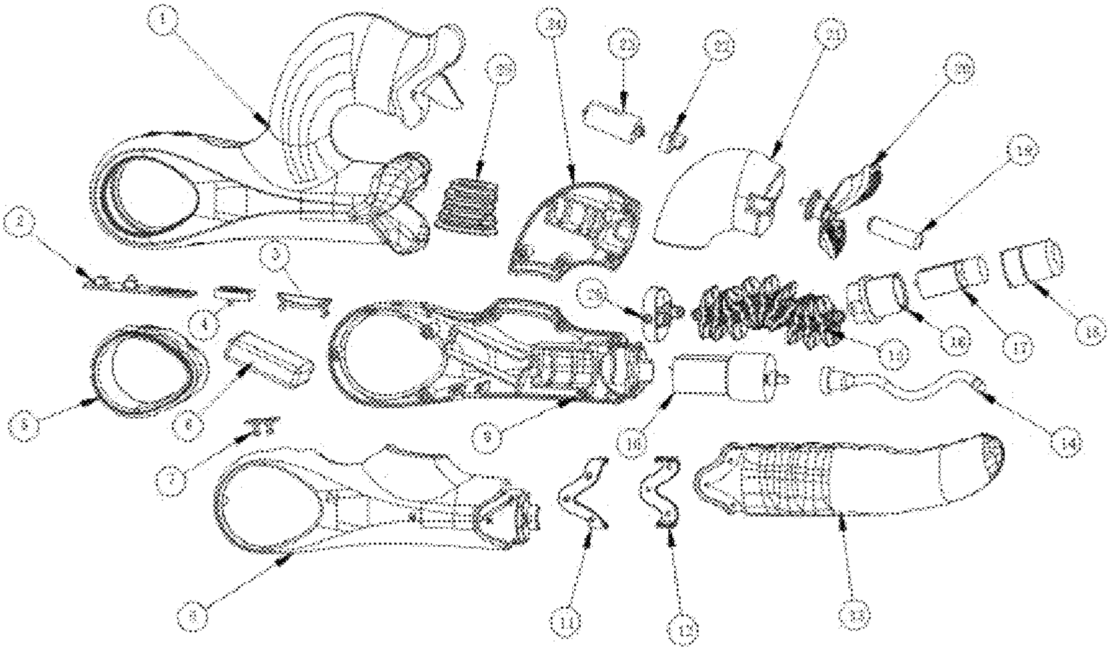
FIG. 8 is an exploded view according to the invention.

With reference to FIGS. 3, 5, and 8, the fixing structure comprises a left sheath fixing member 11 and a right sheath fixing member 12 that are detachably connected; the left sheath fixing member 11 and the right sheath fixing member 12 together fix the soft rubber tongue sleeve 13 to an outer wall of the plastic handle left shell 8 and the plastic handle right shell 9.

Specifically, the soft rubber tongue sleeve 13 is first engaged with the left sheath fixing member 11 and the right sheath fixing member 12. Then, the left sheath fixing member 11 and the right sheath fixing member 12 are mounted onto the outer wall of the plastic handle left shell 8 and the plastic handle right shell 9, thereby fixedly connecting the soft rubber tongue sleeve 13 to the plastic handle left shell 8 and the plastic handle right shell 9.

With reference to FIG. 3, a gearbox motor 10 is installed inside the plastic handle left shell 8 and the plastic handle right shell 9, and an output end of the gearbox motor 10 is connected to a winding mechanism that is located inside the soft rubber tongue sleeve 13.

Specifically, the gearbox motor 10 adopts a 130 type gearbox motor. The gearbox motor 10 drives the winding mechanism that is arranged inside the soft rubber tongue sleeve 13, enabling the soft rubber tongue sleeve 13 to perform winding/peristaltic motions when inserted into the user's body. The winding mechanism adopts a biomimetic design, its motion trajectory simulating the form of biological peristalsis. Combined with the soft material of the soft rubber tongue sleeve 13, after insertion into the user's body, it can stimulate internal sensitive areas in a gentle and rhythmic manner, providing a unique massage sensation.

With reference to FIGS. 3 and 5, the winding mechanism comprises a winding rotating shaft 14 that is fixedly connected to the output end of the gearbox motor 10, and a winding swing piece 15 is arranged on an outer wall of the winding rotating shaft 15; a plastic winding fixing member 26 is connected to outer walls of both the winding rotating shaft 14 and the winding swing piece 15, and the plastic winding fixing member 26 is nested on the outer wall of the plastic handle left shell 8 and the plastic handle right shell 9.

Specifically, multiple sets of winding swing pieces 15 are uniformly arranged on the outer wall of the winding rotating shaft 14 and can achieve significant bending deformation during motion. The winding mechanism, through the rotation of the winding rotating shaft 14 cooperating with the winding swing pieces 15, drives the soft rubber tongue sleeve 13 to perform winding/peristaltic motion. The gearbox motor 10 provides the driving force, causing the winding rotating shaft 14 to rotate. Specifically, by designing the winding rotating shaft 14 in a winding shape, its rotation converts rotational motion into a winding/peristaltic motion, thereby driving the winding swing pieces 15 to perform synchronous wave-like oscillations. These oscillations are transmitted through the soft rubber tongue sleeve 13, enabling it to stimulate internal sensitive areas in a biomimetic peristaltic manner after insertion into the user's body. The plastic winding fixing member 26 supports the motion of the winding rotating shaft 14 and the winding swing piece 15 and is mounted on the outer wall of the plastic handle left shell 8 and the plastic handle right shell 9.

Figure 6:
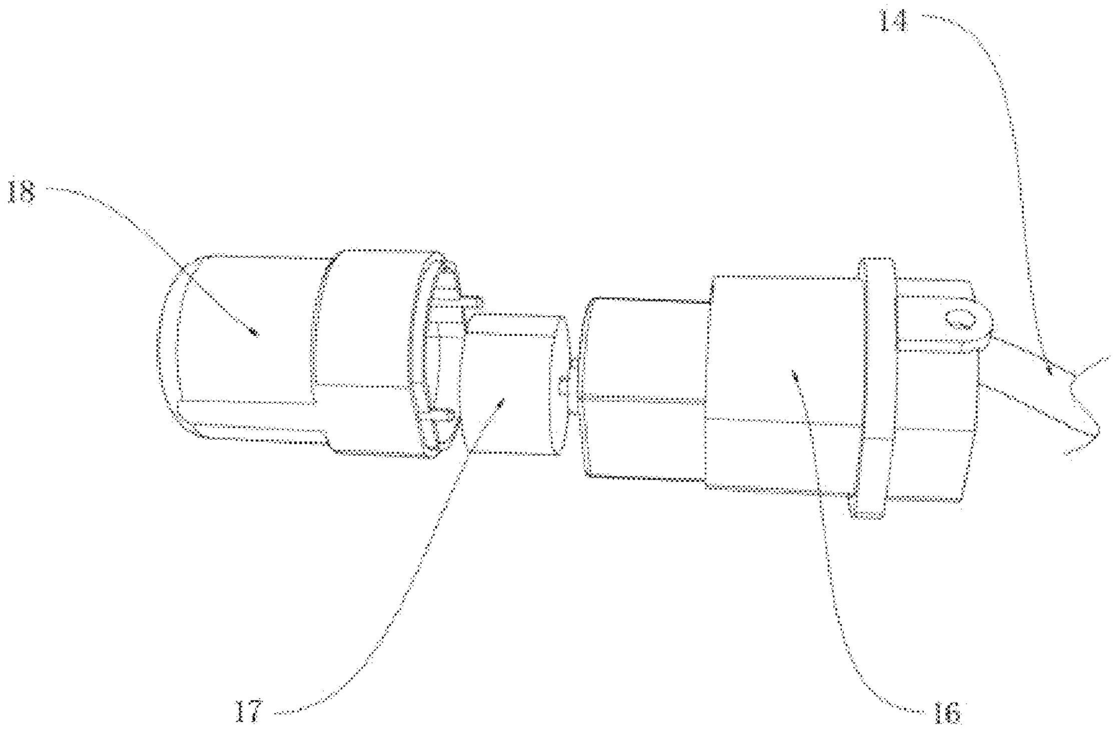
FIG. 6 is a schematic view of the internal structure of the motor lower shell according to the invention.

With reference to FIGS. 5 and 6, the winding mechanism is connected to a motor lower shell 16 that is detachably connected to a motor upper shell 18, and a vibration motor 17 is installed inside the motor lower shell 16 and the motor upper shell 18; both the motor lower shell 16 and the vibration motor 17 are located inside the soft rubber tongue sleeve 13.

Specifically, a motor lower shell 16 is arranged on the side of the winding mechanism away from the internal vibration motor 19. The vibration motor 17 is arranged inside the motor lower shell 16. The motor lower shell 16 and motor upper shell 18 protect the vibration motor 17. The vibration motor 17 produces a vibration effect that is cooperated with the biomimetic peristalsis of the winding mechanism, forming a multi-dimensional massage mode.

It further comprises a power supply module and an operation interaction module that are electrically connected; the power supply module is configured to supply electrical energy to various functional components of the massager, and the operation interaction module is configured for user interaction with the massager to control operation of the massager.

Specifically, the operation interaction module enables convenient control of the massager's operating status. The power supply module and the operation interaction module are electrically connected via wires on the PCBA. Based on user commands, the operation interaction module sends signals to the power supply module via a control circuit to adjust output voltage and current, thereby controlling the start, stop, and working intensity of each functional component. Simultaneously, the power supply module feeds back information such as the status of the battery 6 to the operation interaction module for display.

Figure 7:
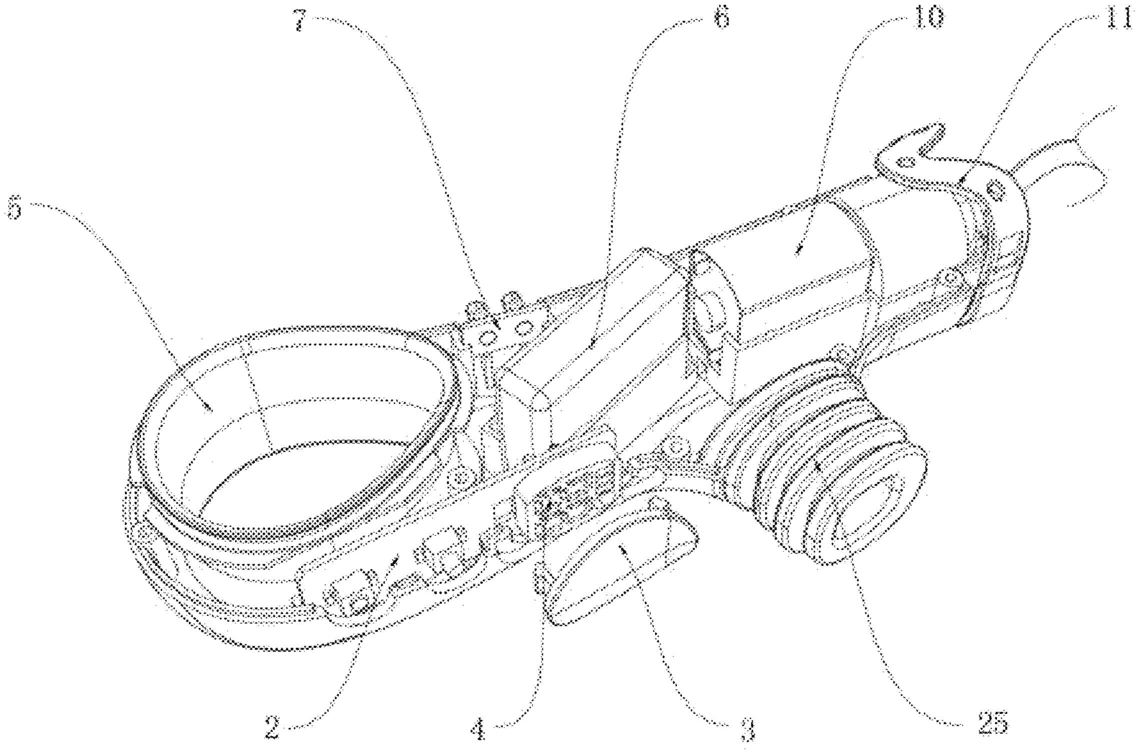
FIG. 7 is a schematic structural view of the PCBA according to the invention.

With reference to FIG. 7, the power supply module comprises one or more batteries 6 that are installed inside the plastic handle left shell 8 and the plastic handle right shell 9.

Specifically, power is supplied using the battery 6, and one or more batteries 6 can be provided according to specific requirements.

With reference to FIG. 7, the battery or batteries 6 are electrically connected to a magnetic charging pin board assembly 7 that is installed inside the plastic handle left shell 8 and the plastic handle right shell 9.

Specifically, the battery 6 can be charged via the magnetic charging pin board assembly 7, facilitating long-term use of the massager.

With reference to FIG. 7, the operation interaction module comprises a PCBA (Printed Circuit Board Assembly) 2 that is installed inside the plastic handle left shell 8 and the plastic handle right shell 9; the PCBA 2 is operable via buttons and is electrically connected to the battery or batteries 6, the gearbox motor 23, the vibration motor 17, the gearbox motor 10, and the internal vibration motor 19.

Specifically, the PCBA 2 serves as the control center of the entire massager, integrating core components such as a microcontroller, power management unit, motor drive circuits, sensor interfaces, and communication modules. The PCBA 2 controls the motion of the gearbox motor 23, vibration motor 17, gearbox motor 10, and internal vibration motor 19. The massager can be operated via buttons.

With reference to FIG. 7, the PCBA 2 is provided with a digital display light shield 4, and the plastic handle left shell 8 and the plastic handle right shell 9 are connected to a digital display transparent cover 3 that is located outside a digital display light shield 4.

Specifically, the digital display light shield 4 is overlaid above the display area of the PCBA 2 and can effectively block external stray light from entering the display area. The digital display transparent cover 3 is installed at the corresponding position on the plastic handle left shell 8 and plastic handle right shell 9 to provide physical protection for the display area, preventing ingress of dust and moisture.

With reference to FIG. 7, a plastic electroplated part 5 is provided inside each of the plastic handle left shell 8 and the plastic handle right shell 9.

Specifically, the plastic electroplated part 5 is added inside the plastic handle left shell 8 and plastic handle right shell 9, and its inner diameter is ergonomically optimized, with a standard size adapted to fit most adult finger diameters of approximately 18-22 mm. During use, the user's index and middle fingers can naturally pass through the plastic electroplated part 5, forming a stable three-point grip structure. This design not only significantly enhances grip stability, reducing the risk of slipping due to sweaty hands or vibrations, but also effectively disperses hand pressure, reducing fatigue during prolonged use. Especially in high-frequency vibration or strong swinging modes, the plastic electroplated part 5 provides reliable grip support, ensuring the massager maintains a stable operating posture and enhancing the safety and comfort of the user experience.

The detachable connection is implemented via a bolted connection.

Specifically, the detachable connection facilitates product assembly, disassembly, and maintenance. Bolted connection is a common connection method, convenient for processing and production, and simple to use.

Although the embodiments of the invention have been shown and described, for those of ordinary skill in the art, it can be understood that various changes, modifications, and substitutions can be made to these embodiments without departing from the principle and spirit of the invention. The protection scope of the invention is defined by the appended claims and the equivalents thereof.

The invention claimed is:

1. A multi-functional massager, comprising a handle silicone, wherein a plastic handle left shell and a plastic handle right shell are arranged inside the handle silicone and are detachably connected; a silicone neck is connected to each of the plastic handle left shell and the plastic handle right shell, and the silicone neck is connected to a plastic partial-bird right shell and a plastic partial-bird left shell that are detachably connected and both arranged inside the handle silicone; a first gearbox motor is installed inside the plastic partial-bird right shell and the plastic partial-bird left shell, and an output end of the first gearbox motor is fixed with an eccentric rotating shaft that is connected to a plastic swing member; a portion of the plastic swing member extends into an interior of the plastic partial-bird right shell and the plastic partial-bird left shell, and another portion is exposed outside; the first gearbox motor drives the eccentric rotating shaft to rotate, and the rotation of the eccentric rotating shaft drives the plastic swing member to swing arbitrarily at 360 degrees;

the plastic handle left shell and the plastic handle right shell are provided with a fixing structure that is connected to a soft rubber tongue sleeve;

the fixing structure comprises a left sheath fixing member and a right sheath fixing member that are detachably connected; the left sheath fixing member and the right sheath fixing member together fix the soft rubber tongue sleeve to an outer wall of the plastic handle left shell and the plastic handle right shell;

a second gearbox motor is installed inside the plastic handle left shell and the plastic handle right shell, and an output end of the second gearbox motor is connected to a winding mechanism that is located inside the soft rubber tongue sleeve; the winding mechanism comprises a winding rotating shaft that is fixedly connected to the output end of the second gearbox motor, and a winding swing piece is arranged on an outer wall of the winding rotating shaft; a plastic winding fixing member is connected to outer walls of both the winding rotating shaft and the winding swing piece, and the plastic winding fixing member is nested on the outer wall of the plastic handle left shell and the plastic handle right shell.

2. The multi-functional massager of claim 1, wherein the plastic swing member is connected to an internal vibration motor that is located inside the handle silicone.

3. The multi-functional massager of claim 1, wherein the winding mechanism is connected to a motor lower shell that is detachably connected to a motor upper shell, and a vibration motor is installed inside the motor lower shell and the motor upper shell; both the motor lower shell and the vibration motor are located inside the soft rubber tongue sleeve.

4. The multi-functional massager of claim 3, wherein it further comprises a power supply module and an operation interaction module that are electrically connected; the power supply module is configured to supply electrical energy to various functional components of the massager, and the operation interaction module is configured for user interaction with the massager to control operation of the massager.

5. The multi-functional massager of claim 4, wherein the power supply module comprises one or more batteries that are installed inside the plastic handle left shell and the plastic handle right shell.

6. The multi-functional massager of claim 5, wherein the battery or batteries are electrically connected to a magnetic charging pin board assembly that is installed inside the plastic handle left shell and the plastic handle right shell.

7. The multi-functional massager of claim 4, wherein the operation interaction module comprises a PCBA (Printed Circuit Board Assembly) that is installed inside the plastic handle left shell and the plastic handle right shell; the PCBA is operable via buttons and is electrically connected to the battery or batteries, the first gearbox motor, the vibration motor, the second gearbox motor, and the internal vibration motor.

8. The multi-functional massager of claim 5, wherein the plastic handle left shell and the plastic handle right shell are connected to a digital display transparent cover that is located outside a digital display light shield.

9. The multi-functional massager of claim 1, wherein the PCBA is provided with a digital display light shield, and a plastic electroplated part is provided inside each of the plastic handle left shell and the plastic handle right shell.

10. He multi-functional massager of claim 1, wherein the detachable connection is implemented via a bolted connection.

11. He multi-functional massager of claim 3, wherein the detachable connection is implemented via a bolted connection.

* * * * *